United States Patent [19]

Kraemer et al.

[11] 4,142,910

[45] Mar. 6, 1979

[54] LIGHT CONSTRUCTION CONCRETE OF SPECIALLY LOW DENSITY

[75] Inventors: Stefan Kraemer, Essen; Michael Seger, Krefeld-Linn; Alois Seidl, Thurnstein, all of Fed. Rep. of Germany

[73] Assignee: Wasag Chemie GmbH, Munich, Fed. Rep. of Germany

[21] Appl. No.: 504,835

[22] Filed: Sep. 10, 1974

[30] Foreign Application Priority Data

Sep. 11, 1973 [DE] Fed. Rep. of Germany ........ 2345692

[51] Int. Cl.² ................................................ C04B 7/02
[52] U.S. Cl. .......................................... 106/97; 106/86
[58] Field of Search ..................................... 106/86, 97

[56] References Cited

U.S. PATENT DOCUMENTS

| 868,762 | 10/1907 | Grow | 106/86 |
|---|---|---|---|
| 2,542,992 | 2/1951 | Clapper | 106/86 |
| 3,814,614 | 6/1974 | Kraemer et al. | 106/64 |

*Primary Examiner*—L. Dewayne Rutledge
*Assistant Examiner*—John P. Sheehan
*Attorney, Agent, or Firm*—Gilbert L. Wells

[57] ABSTRACT

Structurally hermetic light construction concrete which may be reinforced and comprising water, cement and light weight admixtures of inorganic, foamed or bloated or blown aggregates compatible with concrete and approximately spherical or elipsoidal in shape and in proportions corresponding to the sieve characteristic, wherein the grain densities and strengths of the light weight admixtures increase continuously or in more than two steps with increasing grain diameter, while the grain absorptions simultaneously decrease continuously or in more than two steps.

8 Claims, No Drawings

LIGHT CONSTRUCTION CONCRETE OF SPECIALLY LOW DENSITY

CROSS REFERENCE TO A RELATED APPLICATION

Applicants claim priority under 35 U.S.C. 119 for Application P 23 45 692.0, filed Sept. 11, 1973 in the Patent Office of the Federal Republic of Germany.

BACKGROUND OF THE INVENTION

The present invention relates to a structurally hermetic, light construction concrete which may be reinforced and comprises cement and water and inorganic light weight admixtures compatible with concrete and foamed or bloated to be approximately spherical or ellipsoidal shaped aggregates and in proportions approximately corresponding to the sieve characteristic.

By "in proportions approximately corresponding to the sieve characteristic" is meant the proportions of varying grain sizes in the mixture of additives corresponding to FIG. 2 of German Industrial Standard DIN 1045. In FIG. 2 of DIN 1045, the proportions of varying grain size are: 3 to 18 percent by weight passes through 0.25 mm mesh, 12 to 49 percent by weight passes through 1.0 mm mesh, 21 to 62 percent by weight passes through 2.0 mm mesh, 36 to 74 percent by weight passes through 4.0 mm mesh, 60 to 88 percent by weight passes through 8.0 mm mesh, and 100 percent by weight passes through 16.0 mm mesh.

The state of the art of raw material as used in the present invention may be ascertained by reference to the Kirk-Othmer "Encyclopedia of Chemical Technology", 2nd Ed. (1964), Vol. 4, pages 684–710, under the section "Cement", and by reference to U.S. Pat. Nos. 3,184,371 of Seidl; 3,261,894 of Seidl; 3,652,310 of Kraemer et al.; and 3,814,614 of Kraemer et al., which issued May 18, 1965; July 19, 1966; Mar. 28, 1972; and June 4, 1974, respectively. These disclosures are incorporated herein.

Construction light weight concrete must be structurally hermetic in order to ensure corrosion resistance of any reinforcement. For dry densities less than 1 kg/dm$^3$ (kilogram per cubic decimeter for a water; cement ratio of 0.25), it should be endowed with as much compressive strength and heat insulation as possible so as to secure the prescribed properties of the various climatic zones for wall thicknesses of 20 ± 5 cm in monolithic construction.

U.S. Pat. No. 3,814,614 discloses a structural light weight concrete having a filler/cement weight ratio of about (350 ± 100): 650 ± 300) and a water/cement weight ratio of about 0.65 ± 0.25, the improvement comprising light weight fillers comprising:

(a) strongly absorbent, foamed, alkali metal silicate glass, concrete-compatible products of a smooth unbroken surface, of an approximately spherical or ellipsoidal shape in grain sizes of 0.1–6 mm., preferably 0.1–4.0 mm., and bulk densities of 0.15 ± 0.10 kilograms per cubic decimeter, and (b) very hard, low absorbent, foamed or bloated or otherwise made porous inorganic light weight additives in grain sizes of 4–25 mm. and bulk densities of 0.6 ± 0.2 kilograms per cubic decimeter, wherein the volume ratio of (a) to (b) is about 1:9 to 9:1.

The light weight construction concretes of U.S. Pat. No. 3,814,614 are processed in conformity with conventional concrete technology and have compressive strengths of 80–250 kp/cm$^2$ as measured by DIN (German Industrial Standard) 1164 and thermal conductivities λ(measured at 20° C.) of 0.30 to 0.43 kcal/meter-hour° C. for dry densities of 0.92 to 1.14 kg/dm$^3$.

Mention is further made that the compressive strength of light weight construction concrete mostly depends on the grain strength of the coarse admixtures and less on that of the fine admixtures. However, this prior art patent fails to recognize that the compressive strength of light weight construction concrete for constant cement and water content is a function of grain strength and grain density increasing with increasing grain diameter. This concept generally has been ignored when making light weight construction concrete. Grain strength and grain density of the admixtures employed by the prior art to date decrease with increasing grain size within the sieve characteristic line. Furthermore, it was not known that the conventional concrete technology will not affect the compressive strength of a light weight construction concrete for grain sizes between 0.06 and 0.2 mm. Because of their predominantly crystalline nature, they appreciably reduce thermal resistance while undesirably raising the density.

SUMMARY OF THE INVENTION

The present invention therefore has as an object a structurally hermetic light weight construction concrete which may be reinforced and is of specially low density while having as high as possible thermal insulation and compressive strength dependent on density. This is accomplished by using inorganic light admixtures compatible with concrete and in the shape of foamed or expanded ellipsoids or spheres corresponding approximately in their amounts to the sieve characteristic, and of cement and water. The grain densities and strengths for the light weight construction concrete of the present invention increase continuously or in more than two steps with increasing grain diameter, while the grain absorptions simultaneously decrease continuously or in more than two steps.

As regards a preferred characteristic of the invention, the light admixtures consist of chemically different materials such as foam glass granulate and expanded or bloated clay. As regards another characteristic, the light admixtures consist of chemically uniform materials, for instance only foam glass granulate, of which the density, the grain strength and absorptivity are determined by varying the kind and amount of blowing agent, temperature and/or dwell time during the foaming process disclosed in U.S. Pat. Nos. 3,184,371; 3,261,894; 3,652,310 and 3,814,614. Another variation may also be achieved by using density increasing fillers in the foam glass granulate.

Preferably the mixture of light admixtures will be of an upper grain size 10 mm and of an upper density limit of 0.34 kg/dm$^3$, with preferred grain size range of about 0.2 to 10 mm and a density of about 0.20 to 0.34 kg/dm$^3$.

The finished concrete of the present invention has a density less than 0.9 kg/dm$^3$ and a thermal conductivity λ(measured value) less than 0.25 kcal/meter-hour° C. for a compressive strength of 120 kp/cm$^2$ (after 28 days). Such dry density values are achieved even though 350–400 kg of cement/cubic meter are being employed in conventional fashion. Obviously these proportions of cement may be deviated from in either direction, whereby the dry density values are correspondingly affected.

DESCRIPTION OF THE PREFERRED EMBODIMENTS

As experience shows, blown, bloated or foamed granulates become lighter as grain diameter increases in the process of manufacture, for instance in a heated rotary tube, because the lesser grain sizes fuse together more and therefore become heavier for constant heating. In order to achieve the required higher strengths of the present invention, as regards the larger granulates, grading or classification of the green (i.e., non-burned) granulates prior to burning is recommended. Burning and cooling times increase with increasing grain diameters.

The properties of the light weight concrete of the present invention are of interest in many aspects, above all as regards wood-like properties; it may be nailed, screwed and bored into, and be sawed. The behavior of this light weight concrete is especially characteristic in the case of fire, assuming a surface enamel rather than bursting as does heavy concrete. Compressive strength, bending strength with or without reinforcements and thermal conductivity depend on the adjusted density. This light weight concrete is of the same durability as conventional materials. It is particularly well suited for prefinished parts and for the construction of prefinished houses because the conventional processing techniques for heavy concrete may be kept without any changes.

By restricting the admixtures to a few components, receiving of the light weight construction concrete is appreciably simplified and therefore storage is economical.

The following embodiments shown in the Table represent many formulations for a structurally hermetic light weight construction concrete of the present invention, which therefore may be reinforced.

The granulate mentioned in Examples 1 through 3 consists of a preferred execution of an initial product prepared in accordance with the examples of U.S. Pat. Nos. 3,184,371 and 3,261,894, and German Pat. No. 2,151,232, which are granulated, dried and frothed. In this manner one obtains the granulate of groups 0/2 mm and 2/4 mm for grain densities up to 0.3 kg/dm$^3$. In order to achieve the higher grain densities (for instance in excess of 0.3) of the higher granulate groups (for instance from 4 to 8 mm), the initial product is mixed with powdery, preferably silicate fillers such as powdered slag or powdered rock. Subsequently one again granulates, dries and froths. The higher the proportion of filler, the higher the values of grain density and grain strength attainable.

I claim:

1. In a light weight structural concrete composition comprising, water, cement and light weight fillers of inorganic, foamed, bloated or blown aggregates compatible with concrete and approximately spherical or ellipsoidal in shape and in proportions corresponding to the size characteristic wherein 3 to 18 percent by weight passes through 0.25 mm mesh, 12 to 49 percent by weight passes through 1.0 mm mesh, 21 to 62 percent by weight passes through 2.0 mm mesh, 36 to 74 percent by weight passes through 4.0 mm mesh, 60 to 88 percent by weight passes through 8.0 mm mesh, and 100 percent by weight passes through 16.0 mm mesh, the improvement comprising said light weight fillers having grain densities and strength increasing continuously or in a plurality of steps with increasing grain diameter while the grain absorptions simultaneously decrease continuously or in more than two steps.

2. The light weight structural concrete of claim 1, wherein the light weight fillers comprise chemically different materials.

3. The light weight structural concrete of claim 1, wherein the light weight fillers comprise chemically uniform materials wherein the density, grain strength and absorption are determined by varying the kind and amount of the blowing agent during the expansion process.

4. The light weight structural concrete of claim 1, wherein the light weight fillers comprise chemically uniform materials wherein the density, grain strength and absorption are determined by varying the temperature during the expansion process.

5. The light weight structural concrete of claim 1, wherein the light weight fillers comprise chemically uniform materials wherein the density, grain strength and absorption are determined by varying the dwell time during the expansion process.

6. The light weight structural concrete of claim 1, wherein the light weight fillers have a maximum grain size of about 10 mm and a maximum density of about 0.34 kg/dm$^3$.

7. The light weight structural concrete of claim 1, wherein the finished concrete has a dry density less than about 0.9 kg/dm$^3$ and a thermal conductivity λ(measured value) of less than about 0.25 kcal/meter-hour° C. for a compressive strength of up to about 120 kp/cm$^2$ after 28 days.

8. The light weight structural concrete of claim 1, wherein the light weight fillers have a grain size range of about 0.2 to 10 mm and an upper density limit of about 0.34 Kg/dm$^3$.

| Example | 1 | | | 2 | | | 3 | | |
|---|---|---|---|---|---|---|---|---|---|
| | kg | kg/dm$^3$ | dm$^3$ | kg | kg/dm$^3$ | dm$^3$ | kg | kg/dm$^3$ | dm$^3$ |
| Cement | 375 | 3.12 | 120 | 375 | 3.12 | 120 | 350 | 3.12 | 112 |
| Water | 190 | 1.0 | 190 | 190 | 1.0 | 175 | 175 | 1.0 | 175 |
| Core water | 50 | 1.0 | — | 40 | 1.0 | — | 50 | 1.0 | — |
| | 615 | | 310 | 605 | | 310 | 575 | | 287 |
| Granulate 0/2 mm | 50 | 0.2 | 250 | 50 | 0.2 | 250 | 62.5 | 0.25 | 250 |
| Granulate 2/4 mm | 51 | 0.3 | 170 | 68 | 0.4 | 170 | 72 | 0.40 | 180 |
| Granulate 4/8 mm | 108 | 0.4 | 270 | 162 | 0.6 | 270 | 226.4 | 0.80 | 283 |
| | 824 | | 1000 | 885 | | 1000 | 935.9 | | 1000 |
| | Water/Cement | | | Water/Cement | | | Water/Cement | | |
| Wet density kg/dm$^3$ | 0.824 | 0.64 | | 0.885 | 0.63 | | 0.936 | 0.645 | |
| (after 28 days) | 0.75 | 0.45 | | 0.815 | 0.45 | | 0.856 | 0.45 | |
| Dry density kg/dm$^3$ | 0.68 | 0.25 | | 0.755 | 0.25 | | 0.800 | 0.25 | |
| Compressive strength kg/cm$^2$ (after 28 days) | 50 | | | 70 | | | 100 | | |
| Bending strength kp/cm$^2$ | 15 | | | 18 | | | 22 | | |
| λ-value (measured) kcal/m.hr° C. | 0.15 | | | 0.18 | | | 0.21 | | |